April 22, 1924.

J. RANKER

RIDGING MACHINE

Filed Sept. 26, 1922    2 Sheets-Sheet 1

1,491,312

Inventor
JACOB RANKER

By
Attorney

April 22, 1924.
J. RANKER
RIDGING MACHINE
Filed Sept. 26, 1922    2 Sheets-Sheet 2
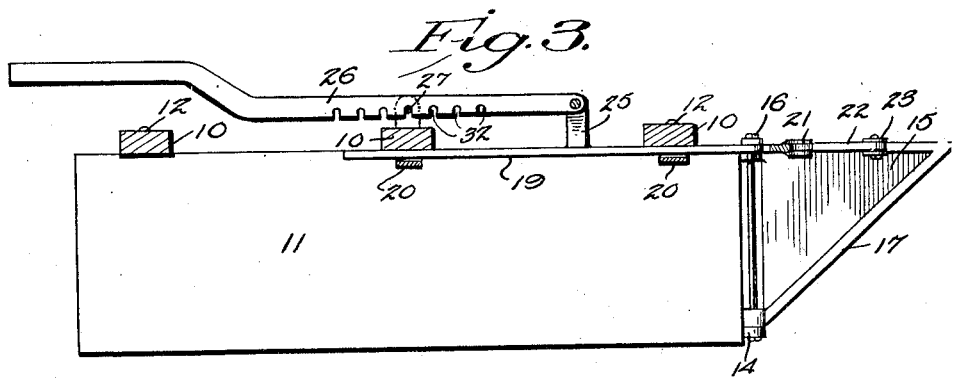
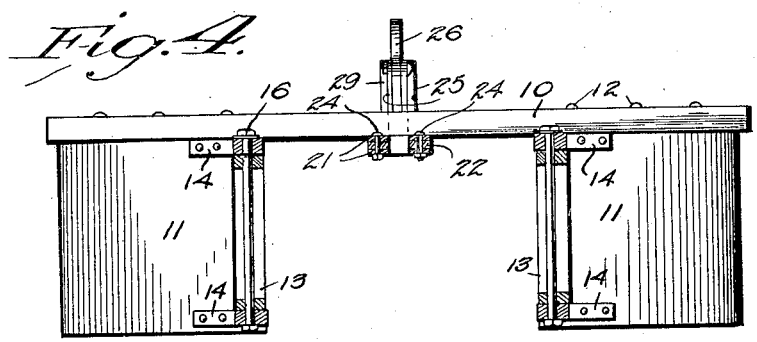
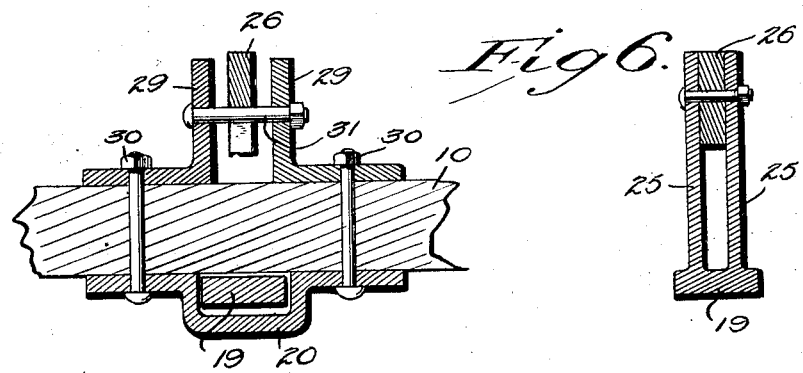
Inventor
JACOB RANKER
By
Attorney Patented Apr. 22, 1924.

1,491,312

UNITED STATES PATENT OFFICE.

JACOB RANKER, OF ANAHEIM, CALIFORNIA.

RIDGING MACHINE.

Application filed September 26, 1922. Serial No. 590,713.

*To all whom it may concern:*

Be it known that I, JACOB RANKER, a citizen of the United States, residing at Anaheim, in the county of Orange and State of California, have invented certain new and useful Improvements in Ridging Machines, of which the following is a specification.

This invention relates to ridging machines and more particularly to such a machine especially adapted for turning up the soil in the form of ridges to form irrigating basins in orchards, etc.

It is the practice to form ridges parallel to each other between the rows of trees in an orchard and to form a second set of parallel ridges at right angles to the first set of ridges to form basins adapted to contain the irrigating water. In the use of ridging machines for the purpose stated it has been found that the depth of the cuts made by the ridger boards varies considerably according to the varying density of the soil. It is an important object of the present invention to provide means for preventing the ridger boards from cutting too deeply when working in soft or sandy soil.

Other objects and advantages of the invention will be apparent during the course of the following description.

In the accompanying drawings I have shown one embodiment of the invention. In this showing:

Figure 3 is a section on line 3—3 of Figure 1,

Figure 4 is a similar view on line 4—4 of Figure 1,

Figure 5 is a similar view on line 5—5 of Figure 1, and,

Figure 6 is a similar view on line 6—6 of Figure 1.

Figure 1:
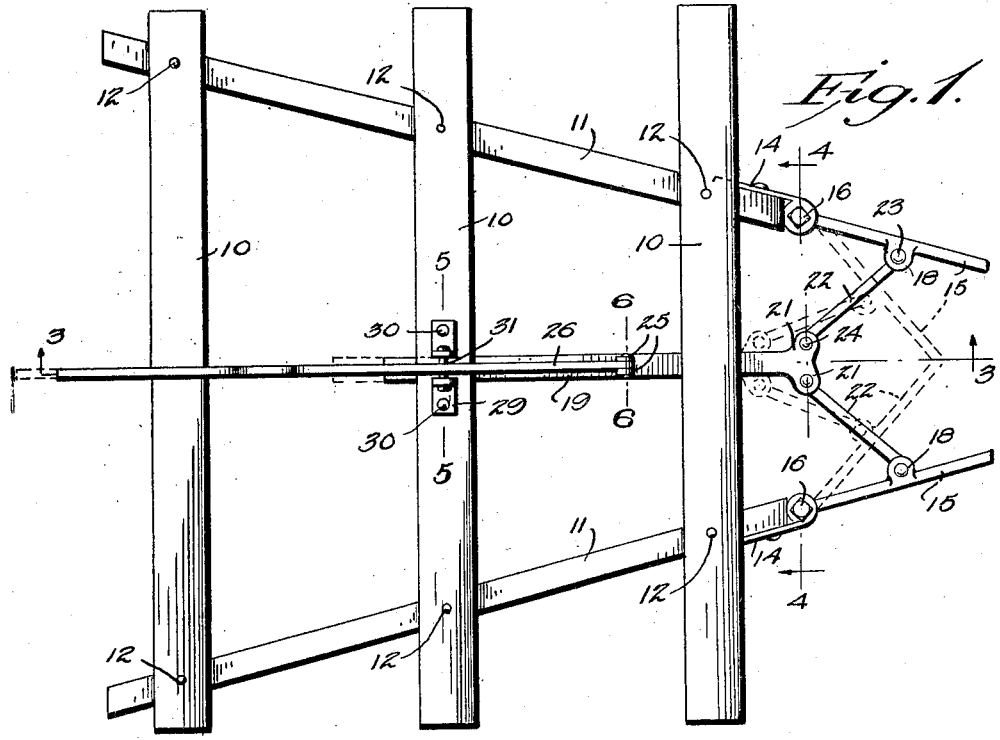
Figure 1 is a plan view of the machine.

In the drawings, the numeral 10 designates a plurality of transverse beams, preferably three in number, as shown. A pair of ridger boards 11 are mounted adjacent opposite sides of the beams and are secured thereto as at 12. As shown the ridger boards converge toward the forward end of the machine and are provided with vertical forward edges 13.

Figure 2:
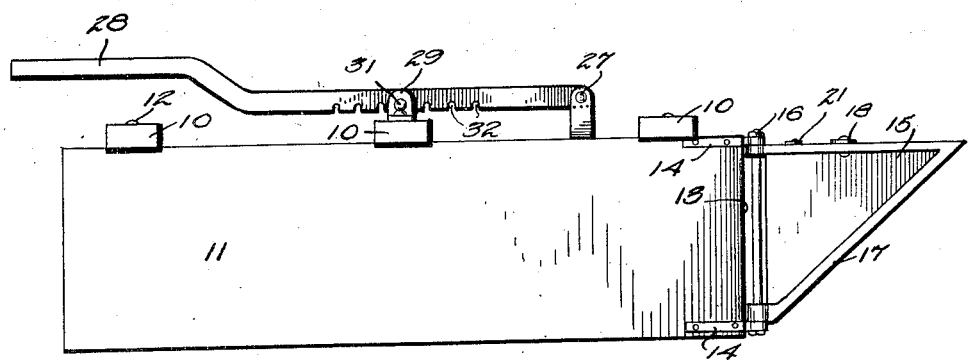
Figure 2 is a side elevation.

Each of the ridger boards 11 is provided adjacent its forward end with a pair of strap hinges 14 arranged adjacent the upper and lower edges of the board. The numeral 15 designates a pair of depth regulating wings pivoted as at 16 between the pairs of strap hinges 14. As shown in Figures 2 and 3, the wings 15 are triangular in shape, the forward edge 17 sloping downwardly toward the rear of the machine. Each of the wings 15 is provided intermediate its ends and adjacent its upper edge with a pair of ears 18 for a purpose to be described.

As shown in Figures 1, 3 and 5, an adjusting bar 19 is arranged beneath the beams 10 substantially centrally thereof. Guides 20 are secured to the beams 10 and adapted to slidably receive the bar 19. The forward end of the bar 19 is provided with a pair of ears 21 and a pair of adjusting links 22 are pivotally connected between the ears 18 and 21, as shown at 23 and 24. The bar 19 is provided preferably intermediate the forward pair of beams 10 with a pair of ears 25 having an adjusting lever 26 pivotally connected thereto at its forward end as at 27. The lever 26 is provided with a handle portion 28 extending rearwardly of the machine.

A pair of ears 29 are secured to the intermediate beam 10 as at 30 and are connected by a locking pin 31. The lower edge of the lever 26 is provided with a plurality of notches 32 adapted to selectively receive the pin 31.

The operation of the machine is a follows:

When the machine is used in ground of ordinary hardness, the wings 15 are arranged in alinement with the ridger boards 11 as shown in the solid lines of Figure 1. With the wings in this position the ridger boards will cut to a normal depth, but when passing through soft or sandy soil will cut more deeply than is desirable. I therefore provide the adjustable wings 15 for regulating the depth of the cut in sandy soil. When passing through sandy soil the handle 28 is raised releasing the notches 32 from the locking pin 31 whereupon the lever 26 may be moved rearwardly as far as desired and the pin 31 engaged within one of the forward notches 32. It will be apparent that when the lever 26 is moved rearwardly the bar 19 and links 22 draw the wings 15 inwardly to the dotted line position shown in Figure 1, or to any intermediate position according to the hardness of the soil. When the wings 15 are drawn inwardly as shown they slightly impede the forward movement of the machine and the inclination of the forward edge 17 of the wings causes the forward end of the ridger boards 11 to be raised slightly thus varying the depth of the cut.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having described my invention, I claim:

1. In a ridging machine, a pair of forwardly converging ridger boards, an adjustable wing pivotally connected with the forward edge of each of said ridger boards, each of said wings having downwardly and rearwardly inclined forward edges, and means for adjusting said wings.

2. In a ridging machine, a pair of forwardly converging ridger boards, hinges carried at the forward edges of said ridger boards, triangular wings pivotally connected with the hinges of the ridger boards, each of said wings having downwardly and rearwardly inclined forward edges, a slidable adjusting bar, a pair of angularly arranged links connecting said wings with the forward end of said bar, and means for locking said bar in selected positions.

3. In a ridging machine, a plurality of transverse beams, a pair of spaced forwardly converging ridger boards secured to said beams, a pair of triangular wings pivoted at their rear edges to the forward edges of said ridger boards, each of said wings having downwardly and rearwardly inclined forward edges, an adjusting bar slidably connected with said beams, a pair of angular links connecting said wings with the forward end of said bar, a lever pivotally connected with said bar, and means for locking said lever in selected positions.

In testimony whereof I affix my signature in presence of two witnesses.

JACOB RANKER.

Witnesses:
ROGER C. DUTTON,
JOHN E. WATERS.